US011896027B2

(12) United States Patent
Miller et al.

(10) Patent No.: US 11,896,027 B2
(45) Date of Patent: Feb. 13, 2024

(54) REDUCED SUGAR COMPOSITION

(71) Applicant: SUGARFAYRE LIMITED, Ashington (GB)

(72) Inventors: Karl Richard Miller, Ashington (GB); John Robert Russell, Ashington (GB)

(73) Assignee: SUGARFAYRE LIMITED, Ashington (GB)

( * ) Notice: Subject to any disclaimer, the term of this patent is extended or adjusted under 35 U.S.C. 154(b) by 873 days.

(21) Appl. No.: 16/624,622

(22) PCT Filed: Jun. 20, 2018

(86) PCT No.: PCT/GB2018/051724
§ 371 (c)(1),
(2) Date: Dec. 19, 2019

(87) PCT Pub. No.: WO2018/234802
PCT Pub. Date: Dec. 27, 2018

(65) Prior Publication Data
US 2020/0128848 A1 Apr. 30, 2020

(30) Foreign Application Priority Data
Jun. 20, 2017 (GB) ..................... 1709865

(51) Int. Cl.
*A23G 3/42* (2006.01)
*A23G 3/34* (2006.01)
(52) U.S. Cl.
CPC .............. *A23G 3/42* (2013.01); *A23G 3/343* (2013.01); *A23G 2200/06* (2013.01)
(58) Field of Classification Search
None
See application file for complete search history.

(56) References Cited

U.S. PATENT DOCUMENTS

| 3,687,690 | A |  | 8/1972 | Moore |  |
|---|---|---|---|---|---|
| 2004/0136923 | A1 | * | 7/2004 | Davidson | A61K 9/0056 424/48 |
| 2009/0214726 | A1 |  | 8/2009 | Ballman et al. |  |

FOREIGN PATENT DOCUMENTS

| EP | 0676147 A1 |  | 10/1995 |  |
|---|---|---|---|---|
| EP | 3641556 |  | 4/2020 |  |
| IL | 79106 A | * | 8/1990 |  |
| WO | WO 94/21826 A1 |  | 9/1994 |  |
| WO | WO 00/53024 A1 |  | 9/2000 |  |
| WO | WO-2006103698 A1 | * | 10/2006 | ............. A21D 15/08 |
| WO | WO 2009/023997 A1 |  | 2/2009 |  |
| WO | WO 2017/122212 A1 |  | 7/2017 |  |
| WO | 2018234802 |  | 12/2018 |  |
| WO | WO-2018234802 A1 | * | 12/2018 | ............. A23G 3/343 |

OTHER PUBLICATIONS

International Preliminary Report on Patentability issued in related International Application No. PCT/GB2018/051724 dated Dec. 24, 2019, 9 pages.
GB Application No. 1709865.8, Search Report dated May 21, 2018.
WIPO Application No. PCT/GB2018/051724, PCT International Search Report and Written Opinion of the International Searching Authority dated Aug. 21, 2018.

* cited by examiner

*Primary Examiner* — Jyoti Chawla
(74) *Attorney, Agent, or Firm* — Gardella Grace P.A.

(57) ABSTRACT

The present invention relates to a sugar paste substrate with a reduced sugar content comprising fondant, fructooligosaccharides (oligofructose or oligofructan) and starch. The paste can be used in standard sugar paste substrate processes, for example to produce printed decorations.

13 Claims, 1 Drawing Sheet

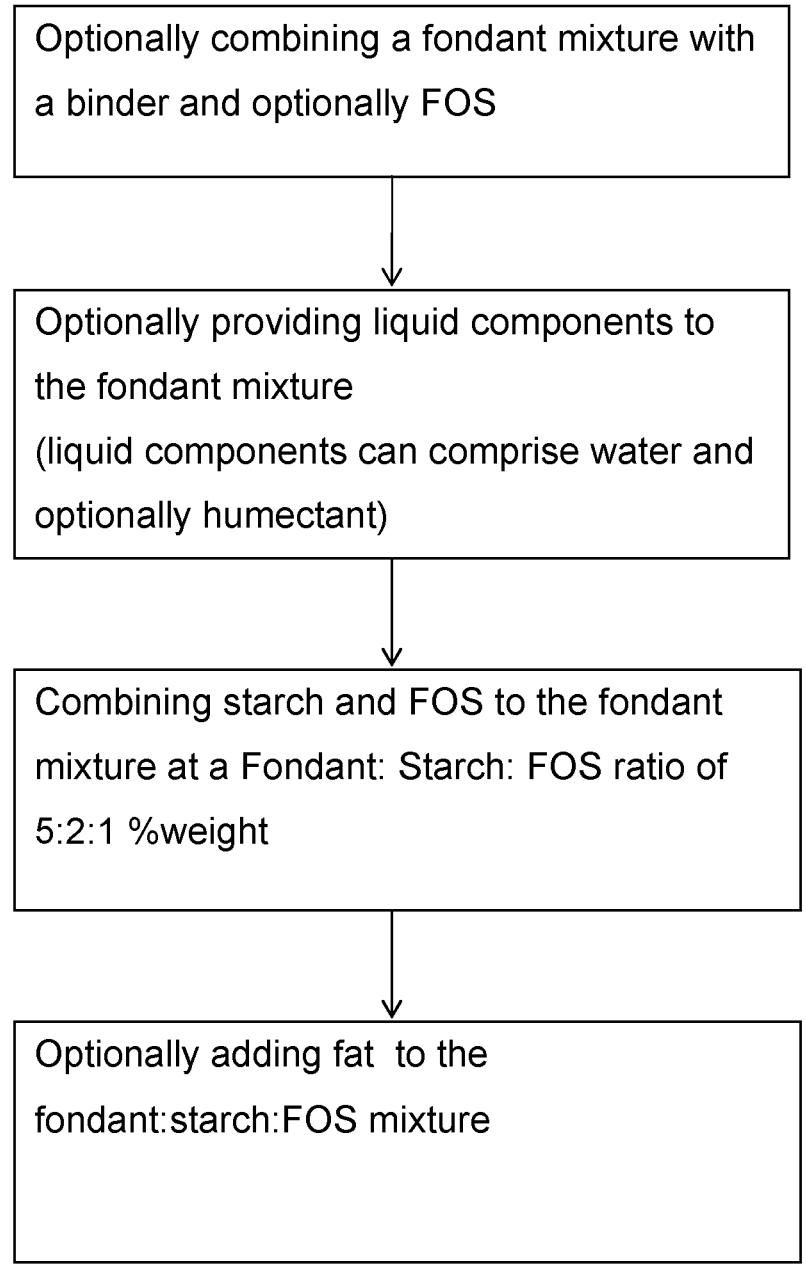

REDUCED SUGAR COMPOSITION

FIELD OF THE INVENTION

The present invention relates to a sugar paste substrate with a reduced sugar content, which can be used in standard sugar paste substrate processes, for example to produce printed decorations.

BACKGROUND OF THE INVENTION

Sugar paste substrates are widely used in the food industry to provide sheets suitable for decoration, for example to apply to cakes and the like.

Typically sugar paste substrates are formed into sheets (approximately 0.7 mm to 6.0 mm thick) and the sheets can then be cut, printed on, or punched out to form sugar paste decorations or plaques for the application to other food products such as cakes.

The production process requires a sugar paste product to be slightly flexible to allow rolling and processing, not deleterious to print and stable under conditions of use.

Edible ink formulations may be provided to a sugar paste substrate using a "screen printing process" wherein a screen fixture is positioned over a surface of a backing paper and the edible material is manually forced through a screen mesh using a squeegee or similar device. Edible ink formulations are well known in the art and can include a viscosity controller, film forming compound, an emulsifier, a food grade colourant and optionally plasticizers and/or humectants. They may be prepared as aqueous solutions.

Present sugar paste substrates include a significant percentage of sugar e.g. 85-90% sugar (78% sucrose, 12% glucose syrup). In view of a desire by some individuals who consume the products, food retailers and many governments there is a drive to reduce the sugar content in food. Reduction of sugar in sugar paste substrates would therefore be advantageous. Current regulations indicate that the indication "reduced sugar" can only be used where the reduction in content is at least 30% compared to a similar product and the amount of energy of the product is equal to or less than the amount of energy in a similar product.

An additional challenge of reducing the sugar percentage in such substrates, whilst retaining suitable processing properties, is that common substitutes for sugar, such as isomalt or other polyols, when used in amounts greater than 10%, must be indicated on the packaging of the product with the warning "excessive consumption may cause laxative effects".

Thus, it would advantageous to provided alternative compositions.

SUMMARY OF THE INVENTION

The present inventors have determined a sugar paste substrate composition which can be utilised under standard processes to produce printed decorations or be coloured or which is provided in a white form. Further the composition has a reduced sugar content in comparison to typical substrates for use in the production of printed decorations. Suitably the composition comprises no polyols or polyols at less than 10%, suitably less than 5%.

Accordingly a first aspect of the present invention provides a sugar paste substrate composition comprising fondant (comprising sugar and glucose), Fructooligosaccharides (FOS) (oligofructose or oligofructan) and a starch, suitably tapioca starch.

As would be understood in the art, the fondant could be provided in a premixed form or separately as sugar and glucose syrup (dried or liquid). If the fondant is provided to the mixture as separate components of sugar and glucose syrup (dried or liquid) then the same overall mixture and ratio can be provided.

Suitably, the starch in the substrate composition may include starches from any native source, wherein native indicates a starch found in nature. Suitable sources for the starch are cereals, tubers, roots, legumes, fruit, Suitably the starch may be provided from sources including; corn, pea, potato, sweet potato, sorghum, banana, barley, wheat, rice, sago, amaranth, tapioca, arrowroot, canna and low (suitably less than 10%, suitably less than 5% amylose) and high (at least 40% weight amylose) amylose containing varieties thereof. Suitably the starch may be provided by corn starch, arrow root starch, katakuri starch, potato starch, sago starch, maize (corn) starch, wheat starch, waxy starches, rice starch and derivatives thereof. Suitably the starch may comprise rice starch or tapioca starch. Suitably starch alternatives may be kuzu powder, sahlab, soy starch, water chestnut flour, almond flour, garbanzo bean flour or coconut flour. Suitably a starch may comprise modified starches, for example distarch phosphate E1412, or acetylated distarch E1422. Suitably a modified starch may be, for example, at least one of a crosslinked starch, modified with blocking groups to inhibit retrogradation, modified by addition of lipophilic groups, acetylated starches, hydroxyethylated and hydroxypropylated starches, inorganically esterified starches, cationic, anionic and oxidized starches, zwitterionic starch or starches, starch or starches modified by enzymes, and combinations thereof.

Those of skill in the art would understand that the quantity of starch provided, based on the quantity of tapioca starch used in the examples, may require adjustment, for example 2:1 to 2 ratio of tapioca starch to corn starch, or potato starch, or arrowroot.

Suitably the starch may have between 15 to 18% amylose. Suitably the starch granules may be smooth spheres with sizes ranging from about 5 to 25 microns.

Suitably the starch may have high water binding capacity. Suitably the starch may have good resistance to shear. Suitably the starch may provide freeze/thaw stability. Suitably the starch may provide a firm texture to the sugar paste composition. Typically it is considered tapioca starch provides such suitable functional aspects and similar functional aspects could be provided by an alternative starch. Suitably the starch may provide a null flavour, and neutral colour to the sugar paste composition. Suitably a neutral colour provides for a white substrate with little discolouration. Suitably the starch may provide a combination of at least two of high water binding capacity, good resistance to shear, freeze/thaw stability, firm texture, a null flavour, and neutral colour to the sugar paste composition.

Suitably the starch may be maize starch. Suitably the starch may be tapioca starch.

Suitably the FOS may be any suitable oligofructose or oligofructan as known in the art, for example the FOS may be provided as fructalose, or Fructopure™ (Crystalline Fructose). Suitably maltinol powder, for example Maltilite P200™, or isomalt may be provided although these are sugar alcohols.

Suitably when mixed with the fondant and FOS, the starch provides a smooth dry paste.

Whilst not wishing to be bound by theory, the inventors consider that FOS is not solely acting as a sweetener in the sugar paste composition, but also provides an advantageous texture when provided with the starch, in particular tapioca starch.

Suitably, the FOS and starch (suitably tapioca starch) combination may be provided at a ratio of about 1:2. The inclusion of the FOS and a starch, suitably a tapioca starch combination allows the amount of sugar and glucose, for example glucose syrup to be reduced in the sugar paste composition.

Suitably the sugar paste composition may comprise sugar, glycerol, glycerin, water and may contain further carbohydrate, viscosity modifiers and thickener materials.

Suitably, the sugar paste composition may comprise 20-30% of a starch, suitably tapioca starch, 10-15% FOS and 50-60% fondant. Suitably the fondant comprises sugar and glucose syrup or dried glucose syrup as would be known in the art, suitably comprising sugar and glucose syrup or dried glucose syrup at a ratio of about 10:1.

As indicated above, in embodiments fondant may be suitably provided as the separate ingredients sugar and glucose syrup (dried or liquid) to the mixture.

Suitably the composition may further comprise a preservative. For example potassium sorbate may be provided in the composition, suitably at about 0.2%.

Suitably the composition may further comprise a humectant. For example glycerine or a sorbitant or other suitable humectant as known in the art may be provided. Suitably a humectant may be provided at about 1 to 8%, suitably 1 to 2% (particularly where the humectant is glycerine), suitably about 1.5%.

Suitably the composition may comprise polysaccharide fibres such as inulin, guar gum, etc to improve elasticity and to aid the creation of a smooth appearance of the sugar paste.

Suitably the composition may further comprise at least one gum or binder, for example xanthan gum. Xanthan gum has been found to be particularly advantageous for sheeted paste. However, as the skilled person would understand, that other gums or binders may provide suitable functional qualities, for example gums and binders such as guar, acacia, locust bean, tragacanth, CMC, sodium alginate, gelatine or pectin or combinations thereof may be provided. Suitably a gum may be provided at about 1 to 2%, suitably about 1.6%

Suitably sugar can be considered the generalized name for sweet, short-chain soluble carbohydrates, many of which are used in food and would be known in the art. Comprising carbon, hydrogen and oxygen, carbohydrate can be derived from a range of sources. Simple monosaccharides can include glucose, fructose, galactose, disaccharides include maltose and lactose and longer chains of monosaccharides are called polysaccharides.

Suitably the composition may comprise flavouring. Suitably the composition may comprise flavouring enhancing agents. Suitably a combination of favouring and flavouring enhancing agents may be provided.

Flavouring may be natural or artificial flavors, for example extracts derived from fruits, plants, e.g. vanilla extract, natural oils, or suitable aldehydes or esters as known in the art.

In embodiments the reduced sugar paste can comprise:

| | |
|---|---|
| Fondant (sugar 88.5-91.5%, dried glucose syrup 8.5-11.5%) | 50-60% |
| Tapioca Starch (suitably Creamgel Tapioca Starch) | 20-30% |
| FOS (suitably Actilight 950P FOS) | 10-15% |
| Water | 2-6% |
| Fat (suitably PALMAX SG Fat) | 3-6% |
| Binder or gum (suitably Xanthan Gum) | 1-2% |
| Humectant (suitably Vegetable Glycerine) | 1-8% |
| Preservative (suitably Potassium Sorbate) | 0-1% |

In embodiments the reduced sugar paste can comprise:

| | |
|---|---|
| Fondant (sugar 88.5-91.5%, dried glucose syrup 8.5-11.5%) | 54.9% |
| Tapioca Starch (suitably Creamgel Tapioca Starch) | 20.9% |
| FOS (suitably Actilight 950P FOS) | 10.4% |
| Water | 5.3% |
| Fat (suitably PALMAX SG Fat) | 5.2% |
| Binder or gum (suitably Xanthan Gum) | 1.6% |
| Humectant (suitably Vegetable Glycerine) | 1.5% |
| Preservative (suitably Potassium Sorbate) | 0.2% |

As will be appreciated by those of skill in the art, Actilight™ is a powder of fructooligosaccharides soluble dietary fibres, short-chain (3 to 5 DP).

As will be appreciated by those of skill in the art Creamgel™ is native tapioca starch.

Suitably sugar and liquid glucose syrup can be provided to provide the fondant. Alternatively sugar and dry glucose syrup can be provided to provide the fondant. Suitably mixes and ratios to form fondant would be known in the art.

Suitably further ingredients or additives may be provided to a composition e.g., colours, flavourings or sweeteners; other gums such as acacia gum, locust bean gum, tragacanth; and/or emulsifiers such as soya lecithin, glycerol monostearate. Suitably, a colouring may be provided to the composition, for example at least one or more of; E100, E101, E102, E104, E110, E120, E122, E123, E124, E127, E129, E131, E132, E133, E140, E141, E142, E150a-d, E151, E153, E155, E160a-e, E161b, E161g, E162, E163, E170, E171, E172, E173, E174, E175, E180. Suitably, fruit extracts and concentrates, vegetable extracts and concentrates, spirulina extract and concentrate or combinations of these may be provided (for example as colouring or flavourings) in the composition.

Advantageously, the composition does not require the use of polyols at level that requires warnings to be applied to the food product. Sugar alcohols or polyols may refer to, for example erythritol, galactitol, hydrogenated starch syrups, including maltitol and sorbitol syrups, inositols, isomalt, lactitol, maltitol, mannitol, xylitol and combinations thereof. Advantageously a composition may be provided where the ingredients are considered to be natural allowing the composition to be "clean label".

According to a second aspect of the present invention there is provided a method of making a sugar paste composition comprising the steps:
combining a fondant composition with a binder such as gum,
providing water and humectant (liquid components),
providing a starch, for example tapioca starch and FOS, wherein the fondant
composition:starch (tapioca starch):and FOS are provided at about a 5:2:1 ratio providing fat to the mixture.

Suitably each of the components may be blended to provide the composition. For example suitably a Z-blade mixer may be used to blend the composition.

Suitably the method of making the sugar paste composition comprises the steps: combining fondant composition with about 1.5% gum, blending with about 5% water, about 1.6% humectant, further blending a starch, for example tapioca starch and FOS, wherein the fondant composition: starch (suitably tapioca starch) and FOS are provided at about a 5:2:1 ratio (for example a fondant composition at mixture 54% fondant, 20% starch (tapioca starch), 10% FOS) and further blending about 5% fat.

Suitably the fondant composition may comprise 8.5%-11.%% glucose syrup/dried glucose with 88.5% to 91.5% sugar. In embodiments this can be blended as an initial step in the method. Alternatively pre-blended fondant may be provided for use in the method.

Suitably in the method the composition may comprise

| | |
|---|---|
| Fondant (sugar 88.5-91.5%, dried glucose syrup 8.5-11.5%) | 50-60% |
| Tapioca Starch (suitably Creamgel Tapioca Starch) | 20-30% |
| FOS (suitably Actilight 950P FOS) | 10-15% |
| Water | 2-6% |
| Fat (suitably PALMAX SG Fat) | 3-6% |
| Binder or gum (suitably Xanthan Gum) | 1-2% |
| Humectant (suitably Vegetable Glycerine) | 1-8% |
| Preservative (suitably Potassium Sorbate) | 0-1% |

Suitably in the method the composition may comprise

| | |
|---|---|
| Fondant (sugar 88.5-91.5%, dried glucose syrup 8.5-11.5%) | 54.9% |
| Tapioca Starch (suitably Creamgel Tapioca Starch) | 20.9% |
| FOS (suitably Actilight 950P FOS) | 10.4% |
| Water | 5.3% |
| Fat (suitably PALMAX SG Fat) | 5.2% |
| Binder or gum (suitably Xanthan Gum) | 1.6% |
| Humectant (suitably Vegetable Glycerine) | 1.5% |
| Preservative (suitably Potassium Sorbate) | 0.2% |

When using dried glucose syrup, all dry ingredients may be combined together and mixed. When using liquid glucose syrup, the dry ingredients may be mixed before the addition of glucose syrup.

Suitably the method may further comprise rolling the reduced sugar substrate into a sheet. Suitably the sheet may be 0.7 mm to 6 mm in thickness.

Suitably the sheet may be an unprinted white sheet, or, if the method includes the addition of colouring to the mixture a coloured sheet.

Suitably the process may comprise the step of forming the substrate into a decoration, for example a rotary moulded decoration.

Suitably, an ink may be provided to the substrate. A variety of inks may be used in relation to such substrates and can be considered as cellulose-based or fondant-based.

Typically cellulose ink may comprise: water 40-90%, humectant 0.1-20%, modified cellulose (E464) 5-10%, ethanol up to 8%, glycerine up to 4%, propylene glycol up 1%.

Typically fondant ink may comprise: fondant icing sugar (sugar 89%, glucose syrup 11%) 20-70%, water 10-30%, emulsifier (E322) 3-7%, maize starch up to 25%, ethanol 2-5%, glycerine 0.3-5%, propylene glycol up to 1%.

All percentages are provided as weight %.

Preferred features and embodiments of each aspect of the invention are as for each of the other aspects mutatis mutandis unless context demands otherwise.

"About" shall generally mean an acceptable degree of error for the quantity measured given the nature or precision of the measurements.

Throughout the specification, unless the context demands otherwise, the terms 'comprise' or 'include', or variations such as 'comprises' or 'comprising', 'includes' or 'including' will be understood to imply the includes of a stated integer or group of integers, but not the exclusion of any other integer or group of integers.

Embodiments of the present invention will now be described by way of example only with reference to the accompanying FIGURE in which:

FIG. 1 provides an exemplary process of the present invention.

EXAMPLES

Example 1—Sugar Paste Composition

A sugar paste composition, with reduced sugar content, was provided comprising

| | | | |
|---|---|---|---|
| Fondant Icing Sugar (sugar 88.5-91.5%, dried glucose syrup 8.5-11.5%) | 100.00 | KG | 54.9% |
| Creamgel Tapioca Starch | 38.00 | KG | 20.9% |
| Actilight 950P FOS | 19.00 | KG | 10.4% |
| Water | 9.60 | KG | 5.3% |
| PALMAX SG Fat | 9.50 | KG | 5.2% |
| Xanthan Gum | 3.00 | KG | 1.6% |
| Vegetable Glycerine | 2.70 | KG | 1.5% |
| Potassium Sorbate | 350.00 | G | 0.2% | in which the component parts were combined by
1. Combining fondant icing sugar and xanthan gum, suitably using a Z-blade mixer,
2. Dissolving the potassium sorbate in water at 90° C.,
3. Adding the glycerine to the sorbate solution and stirring,
4. Adding the glycerine and sorbate solution to the fondant icing sugar and xanthan gum mixture,
5. Blending the combined solution and mixture for 3 minutes, suitably using the Z-blade mixer,
6. Combining Actilight FOS and tapioca starch and adding to the blended mixture and solution of step 5,
7. Blending the mixture of step 6 for 2 minutes whilst adding fat at 50-60° C.,
8. Blending the mixture of step 7 for a further 6 minutes Suitably, the blended mixture of step 8 is allowed to sit for approximately 48 hours before use. Suitably the blended mixture may be stored bagged for future use.

This example of the composition can advantageously be used for screen printing and to provide larger flat decorations.

Example 2

Further compositions of the sugar paste composition were provided as set out below.

| | Example 1 | Variant 1 | Variant 2 |
|---|---|---|---|
| Fondant icing (sugar, glucose syrup) | 54.90% | 56.70% | 56.20% |
| Water | 5.27% | 4.30% | 5.50% |
| Palm fat | 5.22% | 2.30% | 4.50% |
| Glycerine | 1.48% | | 2.10% |
| Sorbitol | | 4.66% | |
| Xanthan | 1.65% | 1.75% | 1.50% |
| LBG | | 0.09% | |

|  | Example 1 | Variant 1 | Variant 2 |
| --- | --- | --- | --- |
| Pot sorbate | 0.19% | 0.20% | 0.20% |
| Actilight 950P | 10.43% | 10.00% | 10.00% |
| Tapioca | 20.86% | 20.00% | 20.00% |
|  | 100.00% | 100.00% | 100.00% |

It is considered the variant compositions noted above can be advantageous in end user printing, for example using a modified desktop printing system.

In particular variant 2 is considered to be particularly advantageous for production of more flexible decorations. Such decorations can be placed on a curved surface without cracking or breaking.

It is proposed the increased glycerine content of variant 2 provides for decreased moisture loss by the composition. This is considered to be particularly suitable for smaller decorations where moisture loss would otherwise would lead to drying of the sugar paste.

Example 3—Use of Sugar Paste Composition

The production process for printed decorations includes paste making, sheeting (typically from 0.7 to 6 mm, suitably 2 mm thick), printing, die cutting, removal of excess substrate, and packing.

The core production process is as follows
1. Roll prepared sugar paste to an even thickness; 0.7 to 2 mm depending on product (done as a continuous roll, for example with a width typically 320 mm)
2. Cut off sheets from roll (e.g., 320×320 mm)
3. Create design on surface, e.g., by screen or off-set printing
4. Punch out individual decorations or plaques using a die cutter
5. Remove excess substrate surrounding decoration (referred to as skeletal waste)

Although the invention has been particularly shown and described with reference to particular examples, it will be understood by those skilled in the art that various changes in the form and details may be made therein without departing from the scope of the present invention.

The invention claimed is:

1. A sugar paste substrate sheet configured for edible printing and having a composition comprising:
    50-60% fondant by weight;
    10-15% fructooligosaccharides (FOS) by weight, wherein the FOS comprises at least one of oligofructose or oligofructan; and
    20-30% starch by weight;
    wherein the fondant comprises sugar, a percentage of the sugar in the fondant by weight being at least 85%, wherein
        the sugar includes sucrose and at least one of glucose syrup or dried glucose syrup;
    wherein, through combining the fondant with 40-50% additional ingredients by weight, the additional ingredients comprising the FOS and the starch, a percentage of the sugar in the composition by weight is at least 30% lower than the percentage of the sugar in the fondant by weight; and
    wherein the composition is sufficiently flexible for rolling or sheeting to create the sugar paste substrate sheet having a thickness between about 0.7 mm and about 3 mm for use in desktop printing and/or screen printing using edible ink.

2. The sugar paste substrate sheet of claim 1, wherein the FOS and the starch are provided at a ratio of about 1:2.

3. The sugar paste substrate sheet of claim 1, wherein the starch is selected from corn (maize), pea, potato, sweet potato, sorghum, banana, barley, wheat, rice, sago, amaranth, tapioca, arrowroot, and canna starch.

4. The sugar paste substrate sheet of claim 3, wherein the starch is tapioca starch.

5. The sugar paste substrate sheet of claim 1, wherein the sugar of the fondant comprises the sucrose and the at least one of glucose syrup or dried glucose syrup at a ratio of about 10:1.

6. The sugar paste substrate sheet of claim 1, wherein the composition further comprises at least one of a humectant or a preservative.

7. The sugar paste substrate sheet of claim 1, wherein the composition further comprises at least one gum or binder.

8. The sugar paste substrate sheet of claim 1, wherein the additional ingredients further comprise:
    2-6% water by weight;
    3-6% fat by weight;
    1-2% of an ingredient selected from a binder and a gum by weight; and
    1-8% of a humectant by weight.

9. The sugar paste substrate sheet of claim 1, wherein the composition further comprises:
    54.9% of the fondant by weight;
    20.9% of the starch by weight, wherein the starch is tapioca starch;
    10.4% of the FOS by weight;
    5.3% water by weight;
    5.2% fat by weight;
    1.6% of a binder or a gum by weight;
    1.5% of a humectant by weight; and
    0.2% of a preservative by weight.

10. The sugar paste substrate sheet of claim 1, wherein the sugar of the fondant comprises 88.5-91.5% sucrose and 8.5-11.5% dried glucose syrup.

11. The sugar paste substrate sheet of claim 1, wherein the composition further comprises 2.3-6% fat by weight.

12. The sugar paste substrate sheet of claim 1, wherein the composition further comprises no greater than 5% of one or more polyols by weight.

13. The sugar paste substrate sheet of claim 1, wherein all sweeteners of the composition are considered to be natural.

* * * * *